(12) United States Patent
Fang et al.

(10) Patent No.: US 8,570,750 B2
(45) Date of Patent: Oct. 29, 2013

(54) HARD DISK DRIVE MOUNT AND HARD DISK DRIVE ASSEMBLY USING SAME

(75) Inventors: Tsai-Yin Fang, Tu-Cheng (TW); Chao-Tang Wang, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 391 days.

(21) Appl. No.: 13/108,972

(22) Filed: May 16, 2011

(65) Prior Publication Data

US 2012/0120590 A1    May 17, 2012

(30) Foreign Application Priority Data

Nov. 17, 2010   (TW) .................................. 99139456

(51) Int. Cl.
*H05K 5/00* (2006.01)
*H05K 7/00* (2006.01)
*H05K 7/16* (2006.01)
*A47B 81/00* (2006.01)

(52) U.S. Cl.
USPC .................. 361/724; 361/679.33; 361/679.34; 361/679.35; 361/679.37; 361/679.39; 361/726; 361/727; 312/223.1; 312/223.2

(58) Field of Classification Search
USPC ............... 361/679.31–679.4, 679.55, 679.58, 361/724–727, 679.17, 679.3, 679.33, 361/679.34–679.41; 312/223.1, 223.2
See application file for complete search history.

(56) References Cited

U.S. PATENT DOCUMENTS

| | | | |
|---|---|---|---|
| 6,351,378 B1 * | 2/2002 | Chao et al. | 361/679.33 |
| 2006/0245158 A1 * | 11/2006 | Chen et al. | 361/685 |
| 2008/0174950 A1 * | 7/2008 | He | 361/685 |

* cited by examiner

*Primary Examiner* — Jayprakash N Gandhi
*Assistant Examiner* — Jerry Wu
(74) *Attorney, Agent, or Firm* — Altis & Wispro Law Group, Inc.

(57) ABSTRACT

An exemplary hard disk drive mount includes a casing and a fixing plate. The casing defines a receiving space configured for receiving hard disk drives therein. The casing defines through holes at one side thereof. The fixing plate includes bulges corresponding to the through holes. The fixing plate is attached to the side of the casing with the bulges respectively traversing through the through holes into the receiving space of the casing. The bulges are elastically deformable such that when a given one of the hard disk drives is received in the receiving space, corresponding ones of the bulges resiliently abut a side of the hard disk drive and exert a compressing force on the hard disk drive whereby the hard disk drive is fixed in the casing.

16 Claims, 4 Drawing Sheets

HARD DISK DRIVE MOUNT AND HARD DISK DRIVE ASSEMBLY USING SAME

BACKGROUND

1. Technical Field

The disclosure generally relates to device mounting, and more particularly to a hard disk drive mount seating a hard disk drive (HDD) in an enclosure of an electronic device, and a hard disk drive assembly using the hard disk drive mount.

2. Description of Related Art

In a computer, one or more hard disk drives are often used for storing information. The hard disk drives are mounted in the electronic device by hard disk drive mounts. However, in general, clearances exist between sides of the hard disk drive and the corresponding hard disk drive mount. Thus, during operation, vibration can be generated, which may cause the hard disk drives to impact the hard disk drive mounts and produce unwanted noise.

What is desired, therefore, is a hard disk drive mount which can overcome the limitations described.

DETAILED DESCRIPTION

Reference will now be made to the figures to describe the present hard disk drive mount and hard disk drive assembly in detail.

Figure 1:
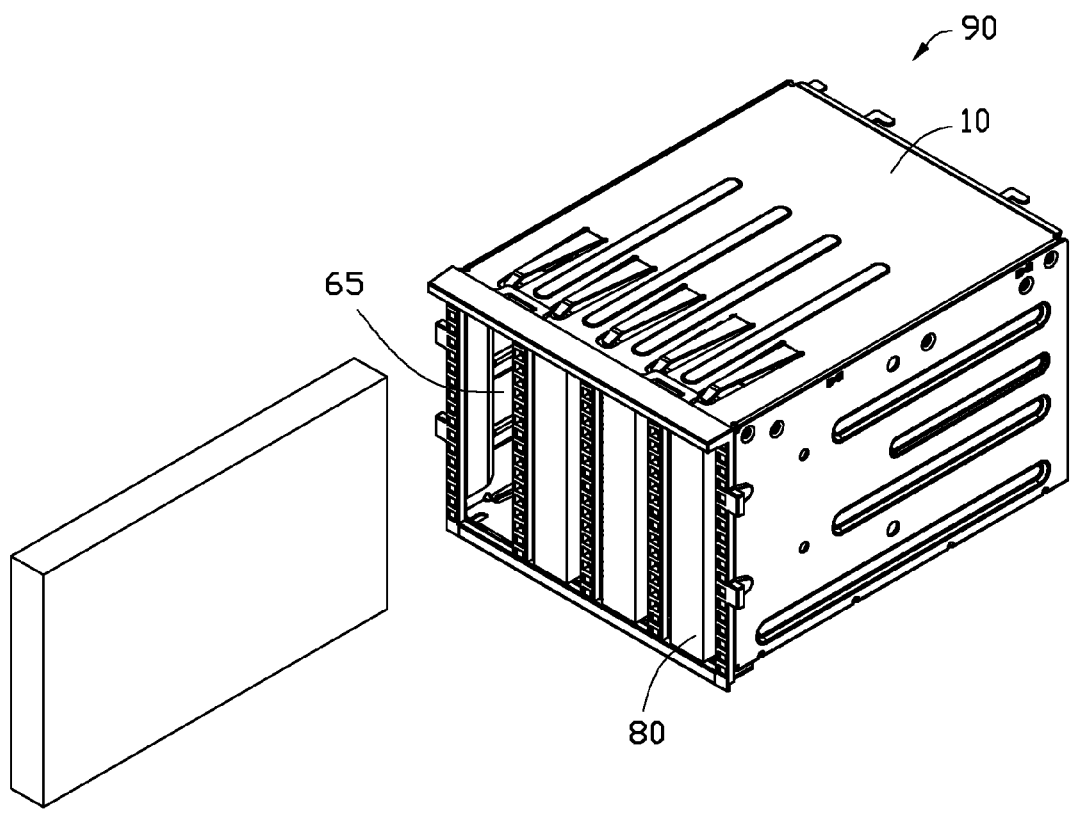
FIG. 1 is an isometric, assembled view of a hard disk drive mount according to an exemplary embodiment of the present disclosure, wherein the hard disk drive mount has a number of hard disk drives received therein to form a hard disk drive assembly.

Referring to FIG. 1, a hard disk drive mount 10 according to an exemplary embodiment of the present disclosure is shown. The hard disk drive mount 10 has a number of hard disk drives 80 received therein to form a hard disk drive assembly 90. The hard disk drive assembly 90 is configured to be installed in a server or a computer for storing information.

Figure 2:
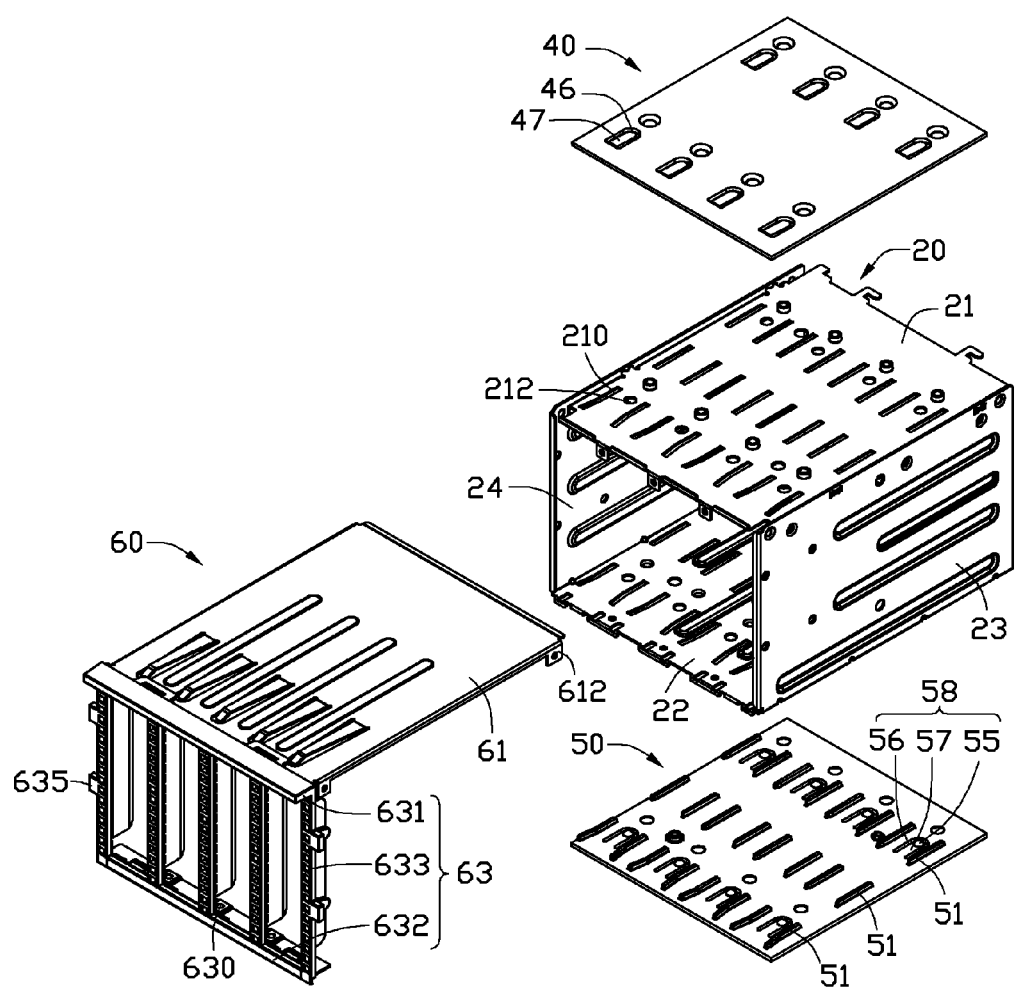
FIG. 2 is an isometric, exploded view of the hard disk drive mount of FIG. 1.
Figure 3:
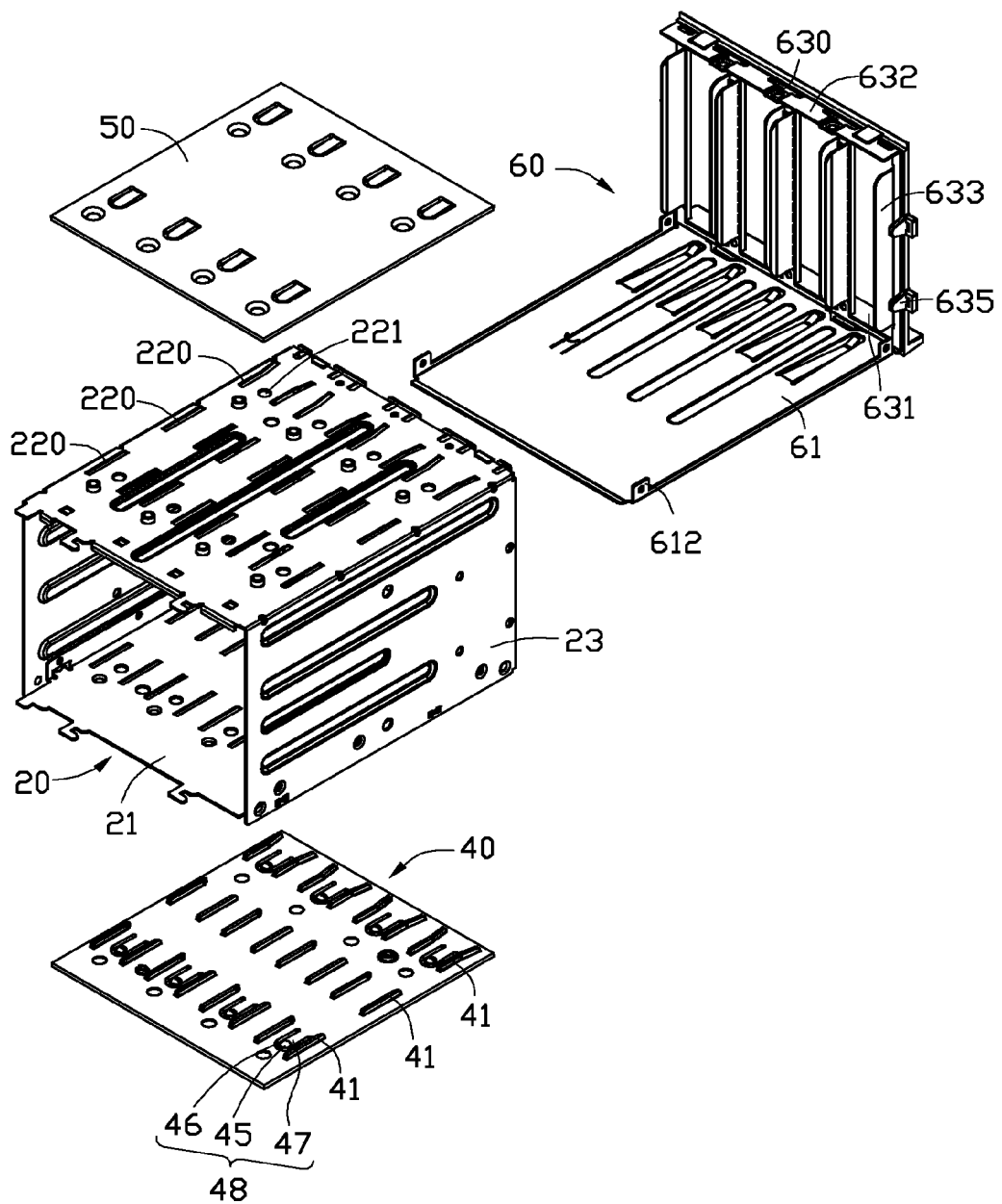
FIG. 3 is similar to FIG. 2, but viewed from a different aspect.

Referring also to FIGS. 2 and 3, the hard disk drive mount 10 includes a hollow rectangular casing 20, a first fixing plate 40 and a second fixing plate 50 at upper and lower sides of the casing 20, respectively, and a connecting frame 60.

The casing 20 includes a rectangular top plate 21, a bottom plate 22 parallel to and spaced apart from the top plate 21, and two side plates 23 interconnected between two opposite sides of the top plate 21 and the bottom plate 22, respectively. The top plate 21, the bottom plate 22 and the side plates 23 cooperatively define a receiving space 24 for receiving the hard disk drives 80 therein. In the present embodiment, the casing 20 can receive four hard disk drives 80 in the receiving space 24. The casing 20 is generally metal, such as magnesium and aluminum alloy, or steel, or other.

The top plate 21 defines a plurality of first perforations 210 therein. The first perforations 210 are in a matrix, and include a plurality of rows of first perforations 210 parallel to and spaced apart from each other. Each row of the first perforations 210 includes a plurality of first perforations 210 aligned along a longitudinal axis of the top plate 21. A distance between each two neighboring rows of the first perforations 210 is substantially equal to a thickness of each hard disk drive 80. A plurality of first through holes 212 is defined in the top plate 21, between the neighboring rows of the first perforations 210.

The bottom plate 22 has substantially the same configuration as the top plate 21. More specifically, the bottom plate 22 defines a plurality of second perforations 220 therein. The second perforations 220 are in a matrix, and include a plurality of rows of second perforations 220 parallel to and spaced apart from each other. Each row of the second perforations 220 includes a plurality of second perforations 220 aligned along a longitudinal axis of the bottom plate 22. A distance between each two neighboring rows of the second perforations 220 is substantially equal to the thickness of each hard disk drive 80. A plurality of second through holes 221 is defined in the bottom plate 22, between the neighboring rows of the second perforations 220.

The first fixing plate 40 and the second fixing plate 50 are generally plastic material. The first fixing plate 40 has a size and a shape substantially the same as the top plate 21 of the casing 20. The first fixing plate 40 includes a plurality of first guiding ribs 41 depending from a bottom surface thereof, the first guiding ribs 41 corresponding to the first perforations 210. The first guiding ribs 41 are in a matrix, and include a plurality of rows of first guiding ribs 41 parallel to and spaced apart from each other. A plurality of first receiving units 48 is formed between each two neighboring rows of the first guiding ribs 41, such plurality of first receiving units 48 corresponding to one hard disk drive 80. Each of the first receiving units 48 includes a first extended hole 46, a first elastic arm 47 extending from a short peripheral side edge of the first extended hole 46, and a first bulge 45 depending from a bottom surface of a free end of the first elastic arm 47. The first bulge 45 is round, and has a curved outer surface.

The second fixing plate 50 has substantially the same configuration as the first fixing plate 40. More specifically, the second fixing plate 50 includes a plurality of second guiding ribs 51 extending upward from a top surface thereof, the second guiding ribs 51 corresponding to the second perforations 220. The second guiding ribs 51 are in a matrix, and include a plurality of rows of second guiding ribs 51 parallel to and spaced apart from each other. A plurality of second receiving units 58 is formed between each two neighboring rows of the second guiding ribs 51, such plurality of second receiving units 58 corresponding to one hard disk drive 80. Each of the second receiving units 58 includes a second extended hole 56, a second elastic arm 57 extending from a short peripheral edge of the second extended hole 56, and a second bulge 55 extending upward from a top surface of a free end of the second elastic arm 57. The second bulge 55 is round, and has a curved outer surface.

The connecting frame 60 overall is L-shaped, and includes a rectangular horizontal wall 61 and a vertical bracket 63 depending from an end of the horizontal wall 61. The horizontal wall 61 includes four fixing tabs 612 depending from four corners thereof, respectively. The vertical bracket 63 includes a first beam 631 connected to the end of the horizontal wall 61, a second beam 632 parallel to and spaced from the first beam 631, and a plurality of connecting beams 633 connected between the first beam 631 and the second beam 632. The second beam 632 defines a plurality of locating holes 630 therein. The connecting beams 633 are equally spaced from each other. Each two neighboring connecting beams 633 are configured to sandwich a corresponding hard disk drive 80 therebetween. An entrance 65 is defined between each two neighboring connecting beams 633, for insertion of a corresponding hard disk drive 80 therethrough and into the casing 20. A plurality of mounting ears 635 extends outward from each of two outmost of the connecting beams 633, respectively.

In assembly of the hard disk drive mount 10, the first fixing plate 40 and the second fixing plate 50 are affixed to the top plate 21 and the bottom plate 22 of the casing 20, respectively. The first guiding ribs 41 of the first fixing plate 40 traverse downward through the first perforations 210 of the top plate 21, respectively, and the first bulges 45 traverse downward through the first through holes 212 of the top plate 21, respectively, such that both the first guiding ribs 41 and the first bulges 45 protrude into a top portion of the receiving space 24 of the casing 20. Similarly, the second guiding ribs 51 of the second fixing plate 20 traverse upward through the second perforations 220 of the bottom plate 22, respectively, and the second bulges 55 traverse upward through the second through holes 221 of the bottom plate 22, respectively, such that both the second guiding ribs 51 and the second bulges 55 protrude into a bottom portion of the receiving space 24 of the casing 20.

Figure 4:
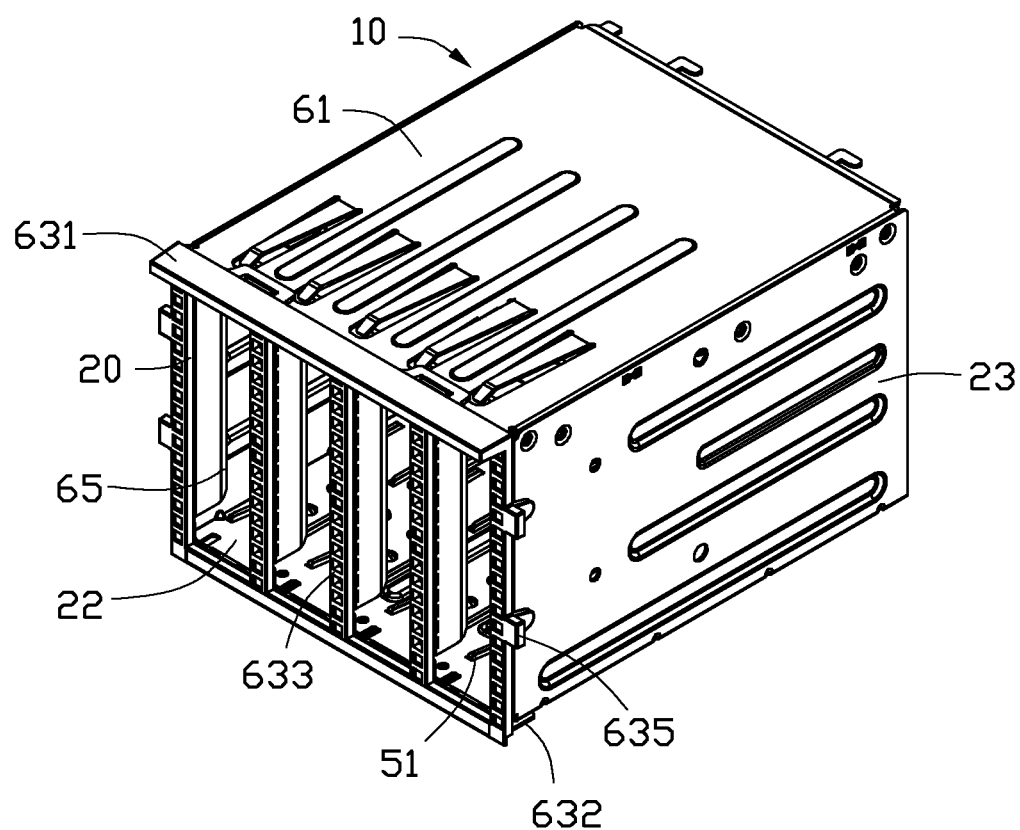
FIG. 4 is an assembled view of the hard disk drive mount of FIG. 2.

Referring also to FIG. 4, the connecting frame 60 is mounted to the casing 20, with the horizontal wall 61 located at a top side of the first fixing plate 40 and the vertical bracket 63 located at a front side of the casing 20. The fixing tabs 612 of the connecting frame 60 connect top ends of the side plates 23 via several fasteners (not shown). The second beam 632 abuts a bottom side of the second fixing plate 50. The mounting ears 635 abut front ends of the side plates 23, respectively. The second beam 632 and the mounting ears 635 are fixed to the bottom plate 22 and the side plates 23 of the casing 20 via several fasteners (not shown), thereby firmly fixing the connecting frame 60 and the casing 20 together.

Referring back to FIG. 1, assembly of one of the hard disk drives 80 into the hard disk drive mount 10 is shown. The hard disk drive 80 is oriented on its side, with elongated lateral sides of the hard disk drive 80 located one above the other, and a rear end of the hard disk drive 80 targeting a corresponding entrance 65. Left and right elongated side edges of the top elongated lateral side of the hard disk drive 80 are aligned with two corresponding rows of first guiding ribs 41, and left and right elongated side edges of the bottom elongated lateral side of the hard disk drive 80 are aligned with two corresponding rows of second guiding ribs 51. As the hard disk drive 80 is slid rearward, the top and bottom elongated lateral sides of the hard disk drive 80 slide along the first and second guiding ribs 41, 51, respectively, until the hard disk drive 80 is substantially wholly received in the receiving space 24 of the casing 20. Thus the first guiding ribs 41 and the second guiding ribs 51 cooperatively guide sliding of the hard disk drive 80 into the casing 20 (in the rearward direction), and out from the casing 20 (in a frontward direction).

By providing the first bulges 45 and the second bulges 55 protruding into the top portion and the bottom portion of the receiving space 24 of the casing 20, respectively, when the hard disk drive 80 is inserted into the hard disk drive mount 10, each corresponding first elastic arm 47 and each corresponding second elastic arm 57 is elastically deformed in a direction away from the hard disk drive 80 by extrusion applied by the top and bottom elongated lateral sides of the hard disk drive 80, respectively. The deformed first and second elastic arms 47, 57 cooperatively exert compressing force on the hard disk drive 80, thereby firmly fixing the hard disk drive 80 in the hard disk drive mount 10. Therefore the first and second elastic arms 47, 57 with the first and second bulges 45, 55 in urging contact with the hard disk drive 80 can efficiently prevent the hard disk drive 80 from vibrating, and/or can efficiently absorb any vibration of the hard disk drive 80. Thereby, annoying sounds during operation of the hard disk drive assembly 90 are prevented or at least minimized.

It is to be understood, however, that even though numerous characteristics and advantages of the embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A hard disk drive mount, comprising:
a casing defining a receiving space configured for receiving a plurality of hard disk drives therein, the casing further defining a plurality of through holes at one side thereof; and a fixing plate comprising a plurality of bulges with curved outer surface corresponding to the through holes, the fixing plate being attached to the one side of the casing with the bulges respectively traversing through the through holes into the receiving space of the casing; wherein the bulges are elastically deformable such that when a given one of the hard disk drives is received in the receiving space, corresponding ones of the bulges resiliently abut a side of the hard disk drive and exert a compressing force on the hard disk drive whereby the hard disk drive is fixed in the casing; and
the fixing plate defines a plurality of receiving units, each of the receiving units comprising an extended hole and an elastic arm extending from a peripheral side edge of the extended hole, the elastic arm having a corresponding one of the bulges formed thereon.

2. The hard disk drive mount of claim 1, wherein the casing defines a plurality of perforations at the one side thereof, and the fixing plate comprises a plurality of guiding ribs corresponding to the perforations, the guiding ribs respectively traversing through the perforations and protruding into the receiving space of the casing, each of parallel pairs of the guiding ribs configured for guiding sliding of a given one of the hard disk drives into the casing and out from the casing.

3. The hard disk drive mount of claim 1, wherein the casing comprises a top plate, a bottom plate spaced apart from the top plate and a plurality of side plates connected between the top plate and the bottom plate, the through holes being defined in the top plate, and the fixing plate being attached to the top plate.

4. The hard disk drive mount of claim 3, further comprising another fixing plate, wherein the bottom plate defines a plurality of through holes therein, the another fixing plate is attached to the bottom plate, and the another fixing plate comprises a plurality of bulges corresponding to the through holes of the bottom plate, respectively.

5. The hard disk drive mount of claim 4, wherein the corresponding bulges of the fixing plate and corresponding ones of the bulges of the another fixing plate abut two opposite sides of the given hard disk drive, respectively, to cooperatively fix the hard disk drive in the casing.

6. The hard disk drive mount of claim 4, wherein the perforations are defined in the top plate, the bottom plate defines a plurality of perforations therein, the another fixing plate further comprises a plurality of guiding ribs corresponding to the perforations of the bottom plate, the guiding ribs of the another fixing plate respectively traversing through the perforations of the bottom plate and protruding into the receiving space of the casing, each of parallel pairs of the guiding ribs of the top plate and each of corresponding parallel pairs of the guiding ribs of the bottom plate cooperatively guiding sliding of a given one of the hard disk drives into the casing and out from the casing.

7. The hard disk drive mount of claim 1, further comprising a connecting frame, the connecting frame comprising a horizontal wall and a plurality of fixing tabs extending from the horizontal wall, the fixing plate being sandwiched between the horizontal wall and the side of the casing, the fixing tabs being connected to the casing.

8. The hard disk drive mount of claim 7, wherein the connecting frame further comprises a vertical bracket depending from the horizontal wall, the vertical bracket comprising a first beam, a second beam, and a plurality of connecting beams connected between the first and second beams, an entrance being defined between each two neighboring connecting beams for insertion of a given one of the hard disk drives therethrough and into the casing.

9. The hard disk drive mount of claim 8, wherein a plurality of mounting ears extend outward from two outmost of the connecting beams, respectively, and the mounting ears are connected to two opposite lateral sides of the casing, respectively.

10. A hard disk drive mount, comprising:
a casing defining a receiving space configured for receiving a plurality of hard disk drives therein, the casing defining a plurality of first through holes at a first side thereof and a plurality of second through holes at a second side thereof opposite to the first side;
a first fixing plate comprising a plurality of first bulges corresponding to the first through holes, the first fixing plate being attached to the first side of the casing with the first bulges respectively traversing through the first through holes into the receiving space of the casing; and
a second fixing plate comprising a plurality of second bulges corresponding to the second through holes, the second fixing plate being attached to the second side of the casing with the second bulges respectively traversing through the second through holes into the receiving space of the casing;
wherein the first bulges and the second bulges are elastically deformable such that when a given one of the hard disk drives is received in the receiving space, corresponding ones of the first bulges and corresponding ones of the second bulges resiliently abut two opposite sides of the hard disk drive, respectively, and cooperatively exert a compressing force on the hard disk drive whereby the hard disk drive is fixed in the casing; and
the casing comprises a top plate with the first through holes, a bottom plate the second through holes spaced apart from the top plate; a connecting frame, the connecting frame comprising a horizontal wall and plurality of fixing tabs extending from the horizontal wall, the first fixing plate being sandwiched between the horizontal wall and the first side of the casing, the fixing tabs being connected to a plurality of side plates connected between the top plate and the bottom plate of the casing.

11. The hard disk drive mount of claim 10, wherein the first fixing plate comprises a plurality of first receiving units, and the second fixing plate comprises a plurality of second receiving units, and wherein each of the first and second receiving units comprises an extended hole and an elastic arm extending from a peripheral side edge of the extended hole, the first and second bulges formed on the elastic arms of the first and second receiving units, respectively.

12. The hard disk drive mount of claim 11, wherein the casing defines a plurality of first perforations at the first side and a plurality of second perforations at the second side thereof, the first fixing plate comprising a plurality of first guiding ribs corresponding to the first perforations, the second fixing plate comprising a plurality of second guiding ribs corresponding to the second perforations, the first and second guiding ribs traversing through the first and the second perforations, respectively, and protruding into the receiving space of the casing, each of parallel pairs of the first guiding ribs and each of corresponding parallel pairs of the second guiding ribs configured for guiding sliding of a given one of the hard disk drives into the casing and out from the casing.

13. The hard disk drive mount of claim 10, wherein each of the bulges comprises a curved outer surface.

14. The hard disk drive mount of claim 10, wherein the connecting frame comprises a vertical bracket depending from the horizontal wall, the vertical bracket comprising a first beam, a second beam, and a plurality of connecting beams connected between the first and second beams, an entrance being defined between each two neighboring connecting beams, for insertion of a given one of the hard disk drives therethrough and into the casing.

15. The hard disk drive mount of claim 14, wherein a plurality of mounting ears extend outward from two outmost of the connecting beams, respectively, and the mounting ears connect another two opposite lateral sides of the casing, respectively.

16. A hard disk drive assembly, comprising:
at least one hard disk drive; and a hard disk drive mount comprising a casing defining a receiving space receiving the at least one hard disk drive therein and a fixing plate, the casing further defining a plurality of through holes at one side thereof, the fixing plate comprising a plurality of bulges with curved outer surface corresponding to the through holes, the fixing plate being attached to the one side of the casing with the bulges respectively traversing through the through holes into the receiving space of the casing; wherein the bulges are elastically deformable such that when the at least one hard disk drive is received in the receiving space, corresponding ones of the bulges resiliently abut a side of the at least one hard disk drive and exert a compressing force on the at least one hard disk drive whereby the at least one hard disk drive is fixed in the casing; and
the fixing plate defines a plurality of receiving units, each of the receiving units comprising an extended hole and an elastic arm extending from a peripheral side edge of the extended hole, the elastic arm having a corresponding one of the bulges formed thereon.

\* \* \* \* \*